(12) United States Patent
Tanaka

(10) Patent No.: US 8,518,615 B2
(45) Date of Patent: Aug. 27, 2013

(54) METHOD OF DRYING ORGANIC PIGMENT, METHOD OF PROCESSING PHTHALOCYANINE PIGMENT, AND METHOD OF MANUFACTURING ELECTROPHOTOGRAPHIC PHOTOSENSITIVE MEMBER

(75) Inventor: Masato Tanaka, Tagata-gun (JP)

(73) Assignee: Canon Kabushiki Kaisha, Tokyo (JP)

( * ) Notice: Subject to any disclaimer, the term of this patent is extended or adjusted under 35 U.S.C. 154(b) by 402 days.

(21) Appl. No.: 12/891,468

(22) Filed: Sep. 27, 2010

(65) Prior Publication Data
US 2011/0076614 A1 Mar. 31, 2011

(30) Foreign Application Priority Data

Sep. 29, 2009 (JP) .................................. 2009-223775
Jul. 16, 2010 (JP) .................................. 2010-161940

(51) Int. Cl.
*G03G 15/02* (2006.01)
*F26B 3/34* (2006.01)

(52) U.S. Cl.
USPC ....... 430/59.4; 430/59.2; 430/59.3; 430/59.5; 34/259; 34/263

(58) Field of Classification Search
USPC ................ 430/59.4, 59.5, 59.2, 59.3; 34/263
See application file for complete search history.

(56) References Cited

U.S. PATENT DOCUMENTS

| 4,615,963 A | 10/1986 | Matsumoto |
| 5,885,737 A | 3/1999 | Tanaka |
| 2005/0100806 A1* | 5/2005 | Hongo et al. .................... 430/78 |
| 2006/0060111 A1* | 3/2006 | Ganschow et al. ............ 106/493 |

FOREIGN PATENT DOCUMENTS

| JP | 2-36937 B | 8/1990 |
| JP | 10-67946 A | 3/1998 |
| JP | 2008-195951 A | 8/2008 |

* cited by examiner

*Primary Examiner* — Thorl Chea
(74) *Attorney, Agent, or Firm* — Canon U.S.A., Inc., IP Division

(57) ABSTRACT

A method of drying an organic pigment is provided which includes an under-depressurization microwave drying step of irradiating the organic pigment with microwaves under depressurization and drying the organic pigment. A method of processing a phthalocyanine pigment and a method of manufacturing an electrophotographic photosensitive member are also provided each of which utilizes the drying method.

12 Claims, 7 Drawing Sheets

METHOD OF DRYING ORGANIC PIGMENT, METHOD OF PROCESSING PHTHALOCYANINE PIGMENT, AND METHOD OF MANUFACTURING ELECTROPHOTOGRAPHIC PHOTOSENSITIVE MEMBER

BACKGROUND OF THE INVENTION

1. Field of the Invention

The present invention relates to a method of drying an organic pigment, a method of processing a phthalocyanine pigment, and a method of manufacturing an electrophotographic photosensitive member.

2. Description of the Related Art

Hitherto, organic pigments have been used as materials of paints and inks. In particular, organic pigments have been widely used as materials of dispersion liquids (paints) for manufacturing electrophotographic photosensitive members (i.e., organic electrophotographic photosensitive members).

In order to give an electrophotographic photosensitive member with satisfactory electrophotographic characteristics, an organic pigment is particularly important which is used as a charge generating material. The charge generating material imposes a great influence upon the electrophotographic characteristics, such as sensitivity of the electrophotographic photosensitive member, quality of an output image, and a potential variation characteristic when the electrophotographic photosensitive member is repeatedly employed. The chemical structure and the crystal form of an organic material have hitherto been known as factors affecting the electrophotographic characteristics. However, it has recently been confirmed that a dispersed state of the organic pigment in a dispersion liquid used to form a charge generating layer (i.e., a coating liquid for a charge generating layer) is also a factor greatly affecting the electrophotographic characteristics. One of factors affecting dispersibility of the organic pigment in the dispersion liquid is, for example, a method of drying the organic pigment before preparation of the dispersion liquid.

Known methods of drying the organic pigment are practiced by blow drying, heat drying, vacuum drying, or a combination of two or more among them. The hardness and shape of the organic pigment are changed depending on the drying method. As a result, the dispersed state of the organic pigment in the dispersion liquid is also changed.

As techniques for improving dispersibility of the organic pigment, Japanese Patent Publication No. 2-36937 and Japanese Patent Laid-Open No. 10-67946 disclose freeze-drying methods, and Japanese Patent Laid-Open No. 2008-195951 discloses a vacuum heat drying method.

The freeze-drying method is a method of freezing a target substance to be dried and sublimating moisture under depressurization, to thereby dry the target substance. The freeze-drying method is advantageous in that, since no heat is applied to the target substance to be dried, degradation of the target substance is comparatively small. Further, the freeze-drying method is advantageous in that, since the target substance is dried with sublimation from ice, the target substance having fine pores and being superior in dispersibility can be obtained.

The vacuum heat drying method is a method of drying a target substance to be dried by heating the target substance under depressurization.

However, the freeze-drying method has the problem that a drying time is prolonged and a drying cost is increased, thus resulting in lower productivity. Further, even though degradation of the target substance to be dried, e.g., the organic pigment, caused by the freeze-drying method is comparatively small, the degradation is problematic in practice when an organic pigment unsuitable for a freezing process or an organic pigment susceptible to oxidation is the target substance to be dried.

The vacuum heat drying method has the problem that, unless the organic pigment as the target substance to be dried is pulverized before drying, a drying time is prolonged, or the drying is suspended in the middle, thus resulting in lower productivity. The reason is that a hard contracted layer is formed on the surface of the organic pigment during the drying and impedes drying of a deep (core) portion of the organic pigment. In addition, the hard contracted layer formed on the surface of the organic pigment adversely affects dispersibility of the organic pigment in a dispersion liquid.

SUMMARY OF THE INVENTION

The present invention provides a method of drying an organic pigment, which is superior in both productivity and dispersibility in a dispersion liquid. The present invention further provides a method of processing a phthalocyanine pigment and a method of manufacturing an electrophotographic photosensitive member, each of which utilizes the method of drying the organic pigment.

According to the present invention, the method of drying the organic pigment includes an under-depressurization microwave drying step of irradiating the organic pigment with microwaves under depressurization and drying the organic pigment.

Further, according to the present invention, the method of processing the phthalocyanine pigment includes an acid pasting step of performing an acid pasting treatment of the phthalocyanine pigment, and a drying step of drying the phthalocyanine pigment by the above-mentioned drying method after the acid pasting step.

In addition, according to the present invention, the method of manufacturing the electrophotographic photosensitive member, which includes a support and a photosensitive layer on the support, includes a drying step of drying an organic pigment by the above-mentioned drying method, and a photosensitive layer forming step of, after the drying step, forming the photosensitive layer by using the dried organic pigment.

Thus, according to the present invention, there are obtained the method of drying the organic pigment, which is superior in both productivity and dispersibility in the dispersion liquid, as well as the method of processing the phthalocyanine pigment and the method of manufacturing the electrophotographic photosensitive member, each of which utilizes the method of drying the organic pigment.

Further features of the present invention will become apparent from the following description of exemplary embodiments with reference to the attached drawings.

DESCRIPTION OF THE EMBODIMENTS

Figure 1A:
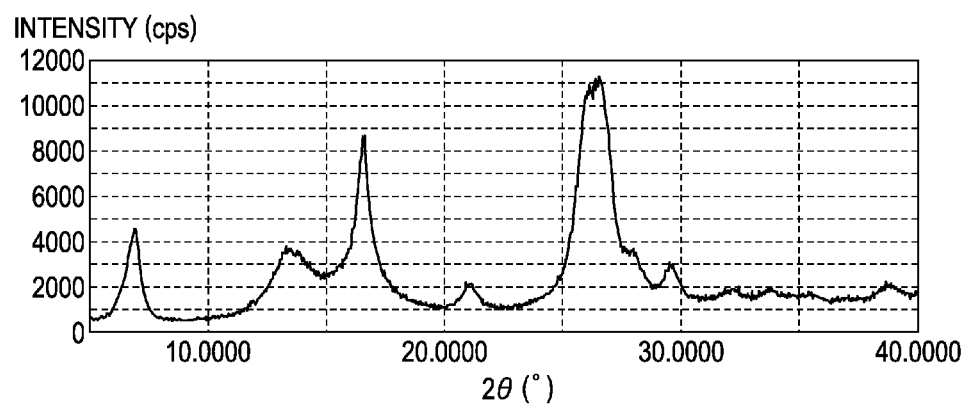
FIG. 1A is a powder X-ray diffraction chart of a hydroxygallium phthalocyanine pigment obtained in Example 1-1.

A method of drying an organic pigment, according to the present invention, is featured in including an under-depressurization microwave drying step of irradiating the organic pigment with microwaves under depressurization and drying the organic pigment.

The term "microwaves" implies UHF (ultrahigh frequency) electromagnetic waves having frequencies in the range of 300 MHz to 30 GHz. Among them, the microwaves having frequencies of 2450 MHz±50 MHz, which are assigned as an ISM band specified for use in Industrial Scientific and Medical Equipment, are advantageously employed.

To dry an organic pigment, i.e., a target substance to be dried, in a short time while suppressing a temperature rise of the organic pigment, an output power of the microwaves is advantageously set such that the organic pigment are irradiated with the microwaves having a high output power in an initial stage, and thereafter the output power of the microwaves is reduced in a stepwise manner. In practice, the output power of the microwaves in the initial stage is advantageously adjusted such that a solid content in the target substance to be dried becomes 80% or more during a microwave irradiation time of 40 to 80 minutes. Further, the output power of the microwaves in the initial stage is advantageously adjusted to be in proportion to a total amount of water and a solvent which are contained in the target substance to be dried, namely, the output power is advantageously set to a higher level at a larger total amount of the water and the solvent which are contained in the target substance.

The expression "under depressurization" implies a condition under pressure lower than the atmospheric pressure (usually 101.3 kPa), and advantageously a condition under pressure of from 2 kPa to 10 kPa. In other words, a degree of vacuum or depressurization (i.e., pressure inside a system (drying apparatus)) is advantageously set to be 2 kPa or above, but 10 kPa or below. By setting the degree of vacuum to be 2 kPa or above, a risk of electric discharge can be reduced. By setting the degree of vacuum to be 10 kPa or below, the boiling points of volatiles from the target substance to be dried can be held lower and hence a temperature rise of the organic pigment can be suppressed. More advantageously, the degree of vacuum is set to be 4 kPa or above, but 10 kPa or below.

In the under-depressurization microwave drying step, gas (open air) is advantageously introduced from the outside of a system (i.e., from the exterior of the drying apparatus) to the inside of the system (i.e., to the interior of the drying apparatus) from the viewpoint of adjusting the degree of vacuum and efficiently discharging the volatiles from the target substance to be dried. The gas introduced is advantageously nitrogen from the viewpoint of minimizing oxidation of the target substance.

Further, from the viewpoint of cooling to suppress a temperature rise of the target substance to be dried and confirming an end point of the drying, it is advantageous to temporarily cut off the microwaves during the under-depressurization microwave drying step and to reduce the degree of vacuum (i.e., the pressure inside the system (drying apparatus)) to be 2 kPa or below.

The water and the solvent which are contained in the organic pigment, i.e., in the target substance to be dried, advantageously have high permittivities (dielectric constants) from the viewpoint of providing excellent efficiency in absorbing the microwaves and excellent energy efficiency. In particular, an organic pigment containing water (i.e., a water-containing organic pigment) has good compatibility with the under-depressurization microwave drying step that is included in the drying method according to the present invention. Therefore, drying of such an organic pigment can be finished in a shorter time than that required in the known drying method, and very high productivity can be obtained.

Examples of the solvent, other than the water, contained in the organic pigment, i.e., in the target substance to be dried, are organic solvents including amide solvents such as N,N-dimethylformamide, N,N-dimethylacetamide, N-methylformamide, N-methylacetamide, and N-methylpropioamide, sulfoxide solvents such as dimethylsulfoxide, and alcohol solvents such as methanol, ethanol, butanol, glycerin and ethylene glycol.

Examples of the organic pigment, i.e., the target substance to be dried, include azo pigments such as mono-azo, bis-azo and tris-azo, phthalocyanine pigments such as metallic phthalocyanine and non-metallic phthalocyanine, indigo pigments such as indigo and thioindigo, perylene pigments such as perylenic anhydride and perylenic imide, and polycyclic quinone pigments such as anthraquinone and pyrenequinone, as well as squalelium, pyrylium salt and thiopyrylium salt. Among them, the phthalocyanine pigments and the azo pigments which are both susceptible to oxidation degradation can be effectively dried by the drying method according to the present invention. In particular, the phthalocyanine pigments are more effective when the drying method according to the present invention is applied, because those pigments are less susceptible to oxidation degradation and can be dried in a shorter time. Further, among the phthalocyanine pigments, metallic phthalocyanine pigments are advantageous in consideration of productivity. Among them, metallic phthalocyanine pigments containing titanium and gallium as central metals are more advantageous. Among them, a hydroxygallium phthalocyanine pigment is even more advantageous.

From the viewpoint of increasing productivity, the drying method according to the present invention can be effectively employed as a step of drying the phthalocyanine pigment (water-containing phthalocyanine pigment) after a step of acid-pasting the phthalocyanine pigment.

The term "acid pasting of the phthalocyanine pigment" implies a process of dissolving or dispersing the phthalocyanine pigment in an acid, pouring a large amount of water to the acid, and repeatedly washing a solid of the re-precipitated phthalocyanine pigment by using an alkaline aqueous solution, as required, and ion-exchanged water until the conductivity of a wash liquid becomes 20 μS or below. Examples of the acid used in the acid pasting treatment include sulfuric acid, hydrochloric acid, and trifluoroacetic acid. Among them, concentrated fluoric acid is an advantageous example. An amount of the acid used is advantageously 10 to 40 times an amount of the phthalocyanine pigment in terms of mass. Further, the temperature at which the phthalocyanine pigment is dissolved or dispersed into the acid is advantageously 50° C. or lower in consideration of decomposition of the phthalocyanine pigment and reaction thereof with the acid.

The following description is made in connection with the case of applying the drying method according to the present invention to steps of producing (processing) the hydroxygallium phthalocyanine pigment, the steps including the acid pasting treatment.

A paste-like hydroxygallium phthalocyanine pigment (water-containing hydroxygallium phthalocyanine pigment) is obtained by acid-pasting a gallium phthalocyanine pigment. A low-crystalline hydroxygallium phthalocyanine pigment is obtained by drying the paste-like hydroxygallium phthalocyanine pigment with the drying method according to the present invention. A crystalline hydroxygallium phthalocyanine pigment is obtained by milling the low-crystalline hydroxygallium phthalocyanine pigment.

The term "milling" implies a process performed by using dispersion (pulverization) media and a milling apparatus. Examples of the dispersion media include glass beads, steel beads, and alumina balls. Examples of the milling apparatus include a sand mill and a ball mill. A milling time is advantageously 4 to 48 hours. In the milling process, advantageously, the Bragg angle of the hydroxygallium phthalocyanine pigment under the milling is confirmed by sampling the pigment at intervals of 4 to 8 hours. An amount of the dispersion media used in the milling process is advantageously 10 to 50 times the amount of the pigment under the milling in terms of mass. When a wet milling process is employed, an amount of a solvent used is advantageously 10 to 30 times the amount of the pigment under the milling in terms of mass.

Examples of the solvent used in the milling process include amide solvents such as N,N-dimethylformamide, N,N-dimethylacetamide, N-methylformamide, N-methylacetamide, and N-methylpropioamide, halogen solvents such as chloroform, ether solvents such as tetrahydrofuran, and sulfoxide solvents such as dimethylsulfoxide.

The organic pigment dried by the drying method according to the present invention is excellent in the function as a photoconductor, and it can be applied to an electrophotographic photosensitive member, a solar cell, a sensor, a switching device, etc. In particular, by forming a photosensitive layer of the electrophotographic photosensitive member by using the organic pigment that has been dried by using the drying method according to the present invention, degradation of the organic pigment caused in the drying step can be reduced and therefore the electrophotographic photosensitive member having excellent electrophotographic characteristics can be obtained.

The following description is made in connection with the case of using the organic pigment dried by the drying method according to the present invention as a charge generating material for the electrophotographic photosensitive member.

Generally, the electrophotographic photosensitive member includes a support and a photosensitive layer on the support.

The photosensitive layer may be a single-layer photosensitive layer containing both a charge generating material and a charge transporting material in a single layer. Alternatively, the photosensitive layer may be a laminated photosensitive layer in which a charge generating layer containing a charge generating material and a charge transporting layer containing a charge transporting material are formed in a laminated state. The charge generating layer and the charge transporting layer may be laminated in order of the charge generating layer and the charge transporting layer from the side close to the support, or in order reversal to the above.

The support used in the present invention is just required to have electrical conductivity (namely, it is just required to be a conductive support). Examples of materials usable for the support include aluminum, an aluminum alloy, copper, zinc, stainless, vanadium, molybdenum, chromium, titanium, nickel, indium, gold, and platinum. Further, the support may have such a structure that a coating of a metal or a metal oxide is formed on a plastic by, e.g., a vacuum deposition process. Examples of the metal or the metal oxide include aluminum, an aluminum alloy, indium oxide, zinc oxide, and an alloy of indium oxide and zinc oxide. As an alternative, the support may have a coating made of conductive particles and a binding resin and formed on a plastic. Further, the support may be made of a conductive polymer. Conductive particles may be particles made of, e.g., aluminum, titanium oxide, tin oxide, zinc oxide, carbon black, or silver. Examples of the plastic include polyethylene, polypropylene, polyvinyl chloride, polyethylene terephthalate, acrylic resins, and polyfluoroethylene. The support may be in the form of, e.g., a cylinder or a film. In addition, the support may be subjected to, e.g., a physical process such as honing, anodization, or a chemical process using an acid.

An underlying layer having a barrier function and/or a bonding function may be disposed between the support and the photosensitive member.

The underlying layer can be formed by applying a coating liquid for the underlying layer, which contains a resin, and by drying the applied coating liquid.

Examples of the resin used to form the underlying layer include polyvinylalcohol, polyethylene oxide, ethyl cellulose, methyl cellulose, casein, polyamides (such as nylon 6, nylon 66, nylon 610, copolymerized nylon, and N-alkoxymethylated nylon), and polyurethane. Further, the resin may be replaced with a glue, aluminum oxide, gelatin, etc.

The thickness of the underlying layer is advantageously 0.1 to 10 μm and more advantageously 0.5 to 5 μm.

When the photosensitive layer is a single-layer photosensitive layer, the single-layer photosensitive layer can be formed by applying a dispersion liquid (i.e., a coating liquid for the photosensitive layer), which contains a charge generating material made of the organic pigment dried by the drying method according to the present invention, a charge transporting material, a binding resin, and a solvent, and then by drying the coated liquid.

When the photosensitive layer is a laminated photosensitive layer, a charge generating layer in the laminated photosensitive layer can be formed by applying a dispersion liquid (i.e., a coating liquid for the charge generating layer), which contains a charge generating material made of the organic pigment dried by the drying method according to the present invention, a binding resin, and a solvent, and then by drying the coated liquid.

The charge transporting layer can be formed by applying a coating liquid for the charge transporting layer, which is prepared by dissolving a charge transporting material and a binding resin in a solvent, and then by drying the applied coating liquid. Examples of the charge transporting material include triarylamine compounds, hydrazone compounds, stilbene compounds, pyrazoline compounds, oxazole compounds, thiazole compounds, and triaryl methane compounds.

When the photosensitive layer is a single-layer photosensitive layer, the thickness of the single-layer photosensitive layer is advantageously 5 to 40 μm and more advantageously 10 to 30 μm.

When the photosensitive layer is a laminated photosensitive layer, the thickness of the charge generating layer is advantageously 0.01 to 10 μm and more advantageously 0.1 to 3 μm. The thickness of the charge transporting layer is advantageously 5 to 40 μm and more advantageously 10 to 30 μm.

When the photosensitive layer is a single-layer photosensitive layer, the content of the charge generating material in the single-layer photosensitive layer is advantageously 3 to 30 mass % with respect to the total mass of the single-layer photosensitive layer. Further, the content of the charge transporting material in the single-layer photosensitive layer is advantageously 30 to 70 mass % with respect to the total mass of the single-layer photosensitive layer.

When the photosensitive layer is a laminated photosensitive layer, the content of the charge generating material in the charge generating layer is advantageously 20 to 90 mass % and more advantageously 50 to 80 mass % with respect to the total mass of the charge generating layer. Further, the content of the charge transporting material in the charge transporting layer is advantageously 20 to 80 mass % and more advantageously 30 to 70 mass % with respect to the total mass of the charge transporting layer.

When the organic pigment dried by the drying method according to the present invention is used as the charge generating material, the organic pigment may be used in a state mixed with one or more other charge generating materials. In such a case, a proportion of the organic pigment dried by the drying method according to the present invention is advantageously 50 mass % or more with respect to the total mass of the charge generating materials.

Examples of the resin (binding resin) used in each of the above-mentioned various layers include polyester, acrylic resins, polyvinyl carbazole, phenoxy resins, polycarbonate, polyvinyl butyral, polystyrene, polyvinyl acetate, polysulfone, polyarylate, polyvinylidene chloride, acrylonitrile copolymers, and polyvinyl benzyl.

A protective layer may be formed on the photosensitive layer.

The protective layer can be formed by applying a coating liquid for the protective layer, which is prepared by dissolving a resin in a solvent, and then by drying the applied coating liquid.

Examples of the resin used for the protective layer include polyvinyl butyral, polyester, polycarbonate, polyimide, polyarylate, polyurethane, styrene-butadiene copolymers, styrene acrylic copolymers, and styrene-acrylonitrile copolymers.

The thickness of the underlying layer is advantageously 0.05 to 20 μm.

The protective layer may contain conductive particles and an ultraviolet absorber. Examples of the conductive particles include metal oxide particles such as tin oxide particles.

Examples of a method of applying the coating liquid for each of the above-mentioned various layers include immersion coating (dipping), spray coating, spinner coating, bead coating, blade coating, and beam coating.

The expressions "%" and "part(s)" used in the following description imply "mass %" and "mass part(s)", respectively, X-ray diffraction measurements of the organic pigments are conducted under conditions listed blow:

Measuring apparatus used: X-ray diffraction apparatus RINT-TTRII made by Rigaku Corporation
X-ray tube: Cu
Tube voltage: 50 kV
Tube current: 300 mA
Scanning method: 2θ/θ scan
Scanning speed: 4.0°/min
Sampling interval: 0.02°
Start angle (2θ): 5.0°
Stop angle (2θ): 40.0°
Attachment: standard sample holder
Filter: not used
Incident monochromator: used
Counter monochromator: not used
Divergence slit: open
Divergence vertical restriction slit: 10.00 mm
Scattering slit: open
Light receiving slit: open
Flat-plate monochromator: used
Counter: scintillation counter Synthesis Example 1

Under an atmosphere of nitrogen flow, 5.46 parts of phthalonitrile and 45 parts of α-chloronaphthalene were loaded into a reaction oven and were heated to temperature of 30° C., following which the temperature was maintained at such a level. Then, 3.75 parts of gallium trichloride was loaded into the reaction oven at the maintained temperature (30° C.). A water content value of the mixture liquid at the time of loading the gallium trichloride was 150 ppm. Thereafter, the temperature was raised to 200° C. After developing reaction of the mixture liquid for 4.5 hours at temperature of 200° C. under an atmosphere of nitrogen flow, the mixture liquid was cooled and a product was filtrated when the temperature reached 150° C. The obtained solid filtrate was subjected to dispersion washing for 2 hours at temperature of 140° C. by using N,N-dimethylformamide and was filtrated again. The obtained solid filtrate was washed with methanol and then dried, whereby 4.65 parts of chlorogallium phthalocyanine pigment was obtained (at a yield of 71%).

Next, 4.65 parts of chlorogallium phthalocyanine pigment thus obtained was dissolved in 139.5 parts of concentrated fluoric acid at temperature of 10° C. and was dripped into 620 parts of ice water under stirring for re-precipitation. The precipitate was filtrated by using a filter press. The obtained wet cake (solid filtrate) was subjected to dispersion washing by using 2% ammonia water and was further filtrated by using the filter press. The obtained wet cake (solid filtrate) was subjected to dispersion washing by using ion-exchanged water and was further filtrated three times by using the filter press. A hydroxygallium phthalocyanine pigment (water-containing hydroxygallium phthalocyanine pigment) containing 23% of solid content was thus obtained.

Synthesis Example 2

700 Parts of water, 120 parts of concentrated hydrochloric acid, and 30.0 parts of 4,4'-diaminobenzophenone were put in a beaker and then cooled to temperature of 0° C. A solution prepared by dissolving 20.5 parts of sodium nitrite in 51 parts of ion-exchanged water was dripped into the mixture liquid over 23 minutes while the liquid temperature was kept at 0 to 5° C. After the dripping, the liquid was stirred for 60 minutes.

Further, 3.2 parts of active carbon was added to the liquid, following which the liquid was stirred for 5 minutes and was filtrated under suction. The obtained liquid filtrate was kept at temperature of 0 to 5° C. while a solution prepared by dissolving 108.6 parts of sodium tetrafluoroborate in 320 parts of ion-exchanged water was dripped into the liquid filtrate over 20 minutes under stirring. After further stirring for 60 minutes, precipitated crystals were filtrated under suction.

The obtained solid filtrate was subjected to dispersion washing for 60 minutes by using 1000 parts of a 5% sodium tetrafluoroborate aqueous solution while the solution temperature was kept at 0 to 5° C., and was further filtrated under suction. The obtained solid filtrate was subjected to dispersion washing for 60 minutes by using a mixture liquid of 140 parts of acetonitrile and 350 parts of isopropyl ether while the liquid temperature was kept at 0 to 5° C., and was further filtrated under suction.

After performing filter washing twice by using 220 parts of isopropyl ether, the solid filtrate was dried under depressurization at room temperature, whereby fluoroborate was obtained (at a yield of 49.5 parts in terms of mass and 86% in terms of percentage).

Next, 1550 parts of N,N-dimethylformamide was put in a beaker, and 57.5 parts of a compound expressed by the following structural formula (1);

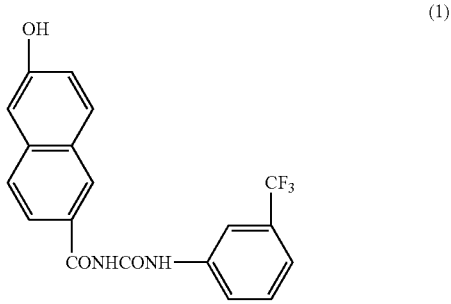

was added to and dissolved in the former. After cooling the liquid temperature to 0° C., 30.0 parts of the above-mentioned fluoroborate was added to the mixture liquid, and 16.9 parts of N-methylmorpholine was dripped into it over 5 minutes.

Thereafter, the mixture liquid was stirred for 2 hours at temperature of 0 to 5° C. and further stirred for 3 hours at room temperature, and was filtrated under suction.

After performing filter washing twice by using 1000 parts of N,N-dimethylformamide, the obtained solid filtrate was subjected to dispersion washing and filtration for 2 hours in repeated cycles four times by using 1500 parts of N,N'-dimethylformamide. Further, the obtained solid filtrate was subjected to dispersion washing and filtration for 2 hours in repeated cycles four times by using 1500 parts of ion-exchanged water, whereby an azo pigment (water-containing azo pigment) containing 20% of a solid content and expressed by the following structural formula (2) was obtained:

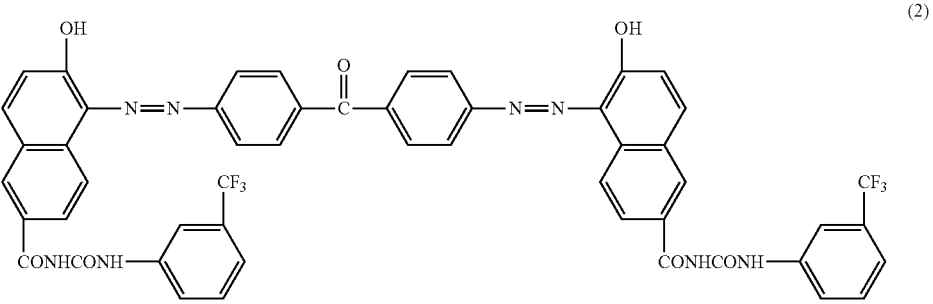

Example 1-1

6.6 Kg of the hydroxygallium phthalocyanine pigment (water-containing hydroxygallium phthalocyanine pigment) obtained in Synthesis Example 1 was dried as follows, by using a hyper-dry drier (trade name: HD-06R, having frequency (resonance frequency) of 2455 MHz±15 MHz and made by Biocon (Japan) Ltd.).

The hydroxygallium phthalocyanine pigment obtained in Synthesis Example 1 was put on a dedicated circular plastic tray in a state (i.e., in the form of a water-containing cake having a thickness of 4 cm or less) as it was immediately after being taken out from the filter press. In the drier, far infrared rays were turned off and the temperature of an inner wall of the drier was set to 50° C. During irradiation of microwaves, a vacuum pump and a leak valve were regulated such that a degree of vacuum was set to a value in the range of 4.0 to 10.0 kPa.

As a first step, the hydroxygallium phthalocyanine pigment was irradiated with 4.8-kW microwaves for 50 minutes. Then, the microwaves were temporarily turned off and the leak valve was temporarily closed to produce a high-vacuum state of 2 kPa or below. A solid content in the hydroxygallium phthalocyanine pigment at that time was 88%.

As a second step, after regulating the leak valve to adjust the degree of vacuum (i.e., the pressure inside the drier) to be within the above-mentioned setting value range (4.0 to 10.0 kPa), the hydroxygallium phthalocyanine pigment was irradiated with 1.2-kW microwaves for 5 minutes. Then, the microwaves were temporarily turned off and the leak valve was temporarily closed to produce a high-vacuum state of 2 kPa or below. The second step was repeated once more (i.e., twice in total). A solid content in the hydroxygallium phthalocyanine pigment at that time was 98%.

As a third step, the hydroxygallium phthalocyanine pigment was irradiated with microwaves in a similar manner to that in the second step except that the power of the microwaves was changed from 1.2 kW in the second step to 0.8 kW. The third step was repeated once more (i.e., twice in total).

As a fourth step, after regulating the leak valve to restore the degree of vacuum (i.e., the pressure inside the drier) to be within the above-mentioned setting value range (4.0 to 10.0 kPa), the hydroxygallium phthalocyanine pigment was irradiated with 0.4-kW microwaves for 3 minutes. Then, the microwaves were temporarily turned off and the leak valve was temporarily closed to produce a high-vacuum state of 2 kPa or below. The fourth step was repeated seven times more (i.e., eight times in total).

Through those steps, 1.52 kg of the hydroxygallium phthalocyanine pigment having the water content of 1% or less was obtained in total 3 hours.

FIG. 1A is a powder X-ray diffraction chart of the obtained hydroxygallium phthalocyanine pigment having the water content of 1% or less.

Example 1-2

1.1 Kg of the hydroxygallium phthalocyanine pigment (water-containing hydroxygallium phthalocyanine pigment) obtained in Synthesis Example 1 was dried as follows, by using a hyper-dry drier (trade name: HD-LAB, having frequency (resonance frequency) of 2455 MHz±15 MHz and made by Biocon (Japan) Ltd.).

The hydroxygallium phthalocyanine pigment obtained in Synthesis Example 1 was put on a dedicated circular plastic tray in a solid state as it was immediately after being taken out from the filter press. In the drier, far infrared rays were turned off and the temperature of an inner wall of the drier was set to 50° C. During irradiation of microwaves, a vacuum pump and a leak valve were regulated such that a degree of vacuum was set to a value in the range of 4.0 to 10.0 kPa.

As a first step, the hydroxygallium phthalocyanine pigment was irradiated with 0.8-kW microwaves for 40 minutes. Then, the microwaves were temporarily turned off and the leak valve was temporarily closed to produce a high-vacuum state of 1 kPa or below.

As a second step, after regulating the leak valve to restore the degree of vacuum (i.e., the pressure inside the drier) to be within the above-mentioned setting value range (4.0 to 10.0 kPa), the hydroxygallium phthalocyanine pigment was irradiated with 0.4-kW microwaves for 3 minutes. Then, the microwaves were temporarily turned off and the leak valve was temporarily closed to produce a high-vacuum state of 1 kPa or below. The second step was repeated fourteen times more (i.e., fifteen times in total). A solid content in the hydroxygallium phthalocyanine pigment at that time was 87%.

The second step was further repeated five times more (i.e., twenty times in total in addition to fifteen times described above).

As a third step, after regulating the leak valve to restore the degree of vacuum (i.e., the pressure inside the drier) to be within the above-mentioned setting value range (4.0 to 10.0 kPa), the hydroxygallium phthalocyanine pigment was irradiated with 0.1-kW microwaves for 3 minutes. Then, the microwaves were temporarily turned off and the leak valve was temporarily closed to produce a high-vacuum state of 1 kPa or below. The third step was repeated nine times more (ten times in total).

Through those steps, 253 g of the hydroxygallium phthalocyanine pigment having the water content of 1% or less was obtained in total 5 hours.

Figure 1B:
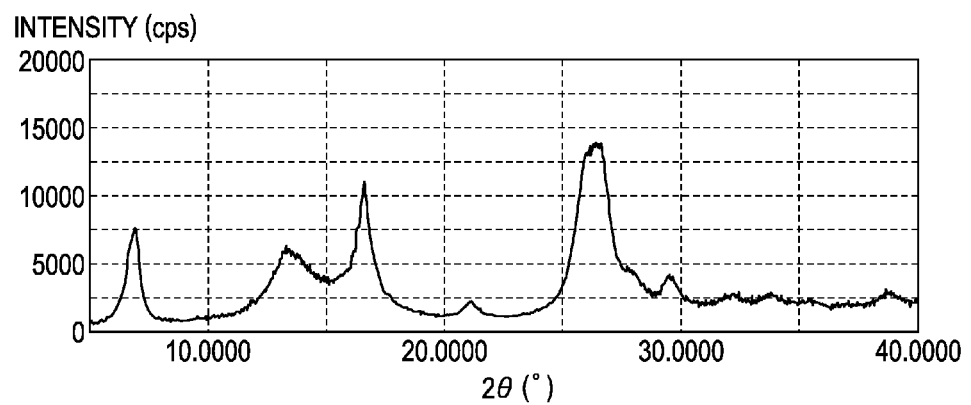
FIG. 1B is a powder X-ray diffraction chart of a hydroxygallium phthalocyanine pigment obtained in Example 1-2.

FIG. 1B is a powder X-ray diffraction chart of the obtained hydroxygallium phthalocyanine pigment having the water content of 1% or less.

Example 1-3

1.1 Kg of the hydroxygallium phthalocyanine pigment (water-containing hydroxygallium phthalocyanine pigment) obtained in Synthesis Example 1 was dried as follows, by using a hyper-dry drier (trade name: HD-LAB, having frequency (resonance frequency) of 2455 MHz±15 MHz and made by Biocon (Japan) Ltd.).

The hydroxygallium phthalocyanine pigment obtained in Synthesis Example 1 was put on a dedicated circular plastic tray in a solid state as it was immediately after being taken out from the filter press. In the drier, far infrared rays were turned off and the temperature of an inner wall of the drier was set to 50° C. During irradiation of microwaves, a vacuum pump and a leak valve were regulated such that a degree of vacuum was set to a value in the range of 4.0 to 10.0 kPa.

As a first step, the hydroxygallium phthalocyanine pigment was irradiated with 0.8-kW microwaves for 10 minutes. Then, the microwaves were temporarily turned off and the leak valve was temporarily closed to produce a high-vacuum state of 2 kPa or below. After regulating the leak valve to restore the degree of vacuum (i.e., the pressure inside the drier) to be within the above-mentioned setting value range (4.0 to 10.0 kPa), the first step was repeated three times more (i.e., four times in total).

As a second step, after regulating the leak valve to restore the degree of vacuum (i.e., the pressure inside the drier) to be within the above-mentioned setting value range (4.0 to 10.0 kPa), the hydroxygallium phthalocyanine pigment was irradiated with 0.4-kW microwaves for 3 minutes. Then, the microwaves were temporarily turned off and the leak valve was temporarily closed to produce a high-vacuum state of 2 kPa or below. The second step was repeated nine times more (i.e., ten times in total).

As a third step, after regulating the leak valve to restore the degree of vacuum (i.e., the pressure inside the drier) to be within the above-mentioned setting value range (4.0 to 10.0 kPa), the hydroxygallium phthalocyanine pigment was irradiated with 0.2-kW microwaves for 3 minutes. Then, the microwaves were temporarily turned off and the leak valve was temporarily closed to produce a high-vacuum state of 2 kPa or below. The third step was repeated four times more (five times in total).

As a fourth step, after regulating the leak valve to restore the degree of vacuum (i.e., the pressure inside the drier) to be within the above-mentioned setting value range (4.0 to 10.0 kPa), the hydroxygallium phthalocyanine pigment was irradiated with 0.1-kW microwaves for 3 minutes. Then, the microwaves were temporarily turned off and the leak valve was temporarily closed to produce a high-vacuum state of 2 kPa or below. The fourth step was repeated seventeen times more (eighteen times in total).

Through those steps, 253 g of the hydroxygallium phthalocyanine pigment having the water content of 1% or less was obtained in total 6 hours.

Figure 2A:
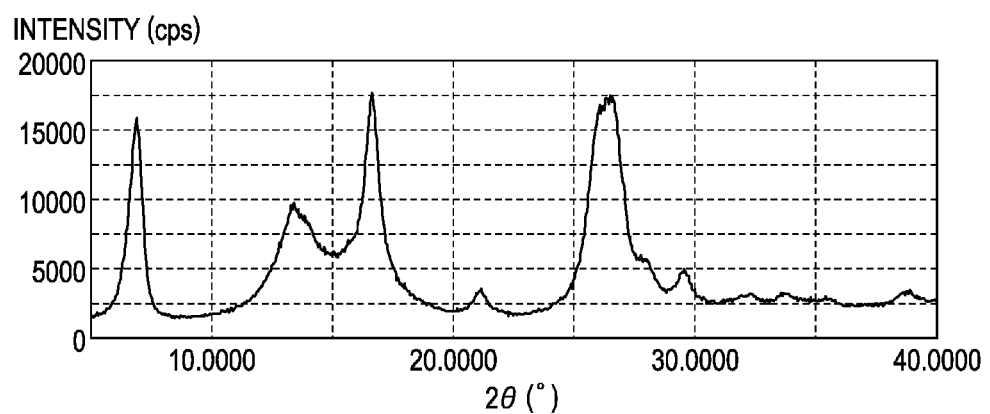
FIG. 2A is a powder X-ray diffraction chart of a hydroxygallium phthalocyanine pigment obtained in Example 1-3.

FIG. 2A is a powder X-ray diffraction chart of the obtained hydroxygallium phthalocyanine pigment having the water content of 1% or less.

Example 1-4

1.1 Kg of the hydroxygallium phthalocyanine pigment (water-containing hydroxygallium phthalocyanine pigment) obtained in Synthesis Example 1 was dried as follows, by using a hyper-dry drier (trade name: HD-LAB, having frequency (resonance frequency) of 2455 MHz±15 MHz and made by Biocon (Japan) Ltd.).

The hydroxygallium phthalocyanine pigment obtained in Synthesis Example 1 was put on a dedicated circular plastic tray after being shaped into the form of a plate having a thickness of 5 cm. In the drier, far infrared rays were turned off and the temperature of an inner wall of the drier was set to 50° C. During irradiation of microwaves, a vacuum pump and a leak valve were regulated such that a degree of vacuum was set to a value in the range of 4.0 to 10.0 kPa.

As a first step, the hydroxygallium phthalocyanine pigment was irradiated with 0.8-kW microwaves for 50 minutes. Then, the microwaves were temporarily turned off and the leak valve were temporarily closed to produce a high-vacuum state of 1 kPa or below. A solid content in the hydroxygallium phthalocyanine pigment at that time was 56%.

As a second step, after regulating the leak valve to adjust the degree of vacuum (i.e., the pressure inside the drier) to be within the above-mentioned setting value range (4.0 to 10.0 kPa), the hydroxygallium phthalocyanine pigment was irradiated with 0.2-kW microwaves for 8 minutes. Then, the microwaves were temporarily turned off and the leak valve was temporarily closed to produce a high-vacuum state of 1 kPa or below. The second step was repeated seven times more (i.e., eight times in total). A solid content in the hydroxygallium phthalocyanine pigment at that time was 98%.

As a third step, after regulating the leak valve to adjust the degree of vacuum (i.e., the pressure inside the drier) to be within the above-mentioned setting value range (4.0 to 10.0 kPa), the hydroxygallium phthalocyanine pigment was irradiated with 0.1-kW microwaves for 3 minutes. Then, the microwaves were temporarily turned off and the leak valve was temporarily closed to produce a high-vacuum state of 1 kPa or below. The third step was repeated five times more (six times in total).

Through those steps, 253 g of the hydroxygallium phthalocyanine pigment having the water content of 1% or less was obtained in total 4 hours.

Figure 2B:
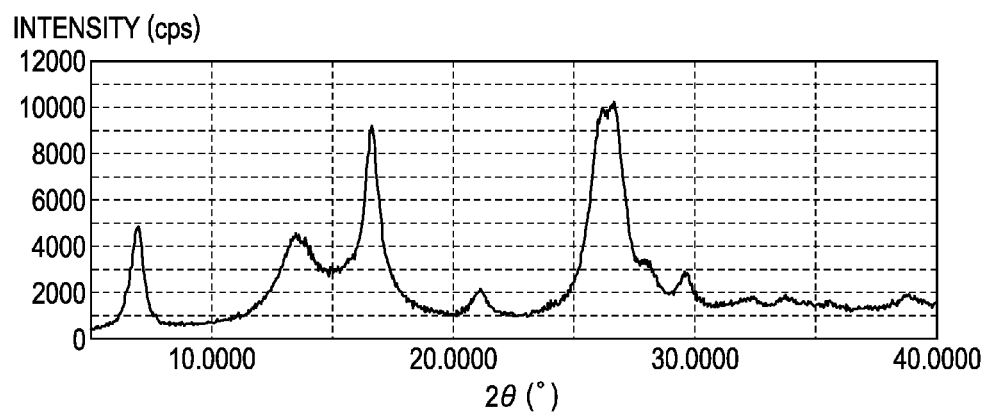
FIG. 2B is a powder X-ray diffraction chart of a hydroxygallium phthalocyanine pigment obtained in Example 1-4.

FIG. 2B is a powder X-ray diffraction chart of the obtained hydroxygallium phthalocyanine pigment having the water content of 1% or less.

Example 1-5

200 G of the hydroxygallium phthalocyanine pigment (water-containing hydroxygallium phthalocyanine pigment) obtained in Synthesis Example 1 was dried as follows, by using a hyper-dry drier (trade name: HD-LAB, having frequency (resonance frequency) of 2455 MHz±15 MHz and made by Biocon (Japan) Ltd.).

The hydroxygallium phthalocyanine pigment obtained in Synthesis Example 1 was put on a dedicated circular plastic tray in a solid state as it was immediately after being taken out from the filter press. In the drier, far infrared rays were adjusted such that the dummy temperature in a central portion of the drier was set to 50° C. The temperature of an inner wall of the drier was also set to 50° C. During irradiation of microwaves, a vacuum pump and a leak valve were regulated such that a degree of vacuum was set to a value in the range of 4.0 to 10.0 kPa.

As a first step, the hydroxygallium phthalocyanine pigment was irradiated with 0.2-kW microwaves for 40 minutes. Then, the microwaves were temporarily turned off and the leak valve was temporarily closed to produce a high-vacuum state of 1 kPa or below. A solid content in the hydroxygallium phthalocyanine pigment at that time was 57%.

As a second step, after regulating the leak valve to adjust the degree of vacuum (i.e., the pressure inside the drier) to be within the above-mentioned setting value range (4.0 to 10.0 kPa), the hydroxygallium phthalocyanine pigment was irradiated with 0.1-kW microwaves for 3 minutes. Then, the microwaves were temporarily turned off and the leak valve was temporarily closed to produce a high-vacuum state of 1 kPa or below. The second step was repeated twenty-nine times more (i.e., thirty times in total).

Through those steps, 46 g of the hydroxygallium phthalocyanine pigment having the water content of 1% or less was obtained in total 5.5 hours.

Figure 3A:
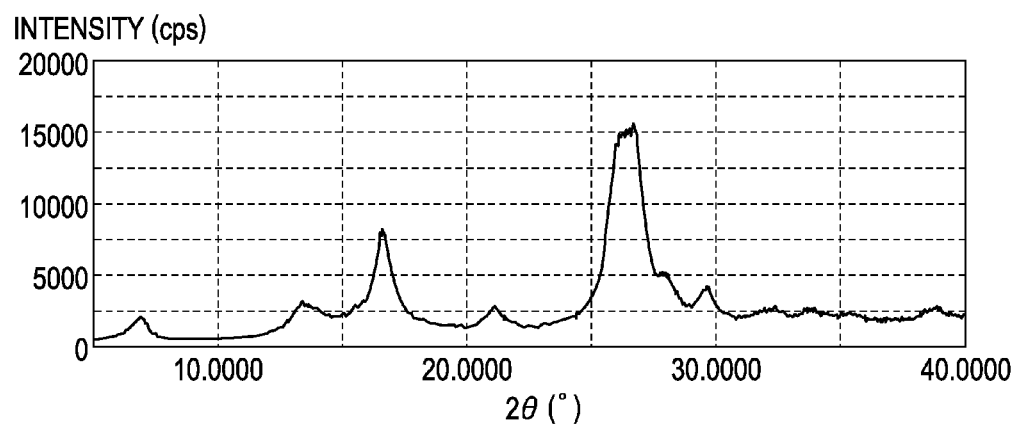
FIG. 3A is a powder X-ray diffraction chart of a hydroxygallium phthalocyanine pigment obtained in Example 1-5.

FIG. 3A is a powder X-ray diffraction chart of the obtained hydroxygallium phthalocyanine pigment having the water content of 1% or less.

Example 1-6

200 G of the hydroxygallium phthalocyanine pigment (water-containing hydroxygallium phthalocyanine pigment) obtained in Synthesis Example 1 was dried as follows, by using a hyper-dry drier (trade name: HD-LAB, having frequency (resonance frequency) of 2455 MHz±15 MHz and made by Biocon (Japan) Ltd.).

The hydroxygallium phthalocyanine pigment obtained in Synthesis Example 1 was put on a dedicated circular plastic tray in a solid state as it was immediately after being taken out from the filter press. In the drier, far infrared rays were turned off and the temperature of an inner wall of the drier was set to 50° C. During irradiation of microwaves, a vacuum pump and a leak valve were regulated such that a degree of vacuum was set to a value in the range of 4.0 to 10.0 kPa.

As a first step, the hydroxygallium phthalocyanine pigment was irradiated with 0.2-kW microwaves for 40 minutes. Then, the microwaves were temporarily turned off and the leak valve was temporarily closed to produce a high-vacuum state of 1 kPa or below. A solid content in the hydroxygallium phthalocyanine pigment at that time was 52%.

As a second step, after regulating the leak valve to adjust the degree of vacuum (i.e., the pressure inside the drier) to be within the above-mentioned setting value range (4.0 to 10.0 kPa), the hydroxygallium phthalocyanine pigment was irradiated with 0.1-kW microwaves for 3 minutes. Then, the microwaves were temporarily turned off and the leak valve was temporarily closed to produce a high-vacuum state of 1 kPa or below. The second step was repeated nineteen times more (i.e., twenty times in total).

Through those steps, 46 g of the hydroxygallium phthalocyanine pigment having the water content of 1% or less was obtained in total 4 hours.

Figure 3B:
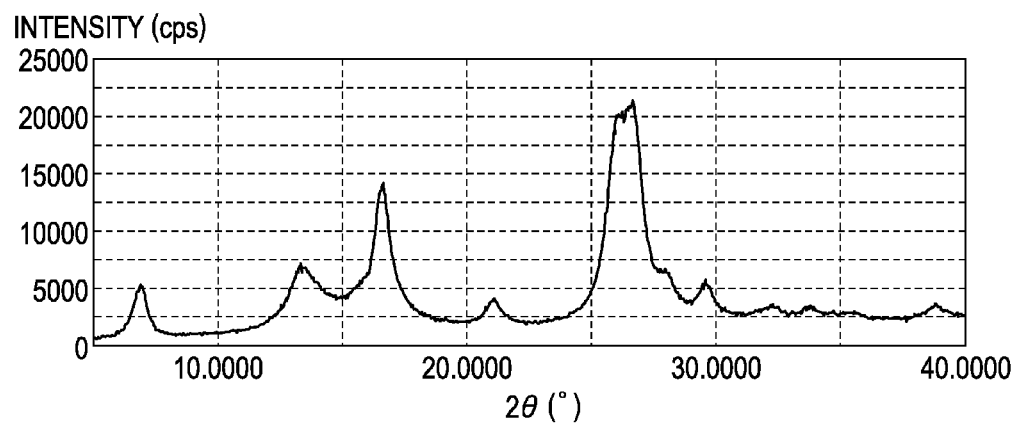
FIG. 3B is a powder X-ray diffraction chart of a hydroxygallium phthalocyanine pigment obtained in Example 1-6.

FIG. 3B is a powder X-ray diffraction chart of the obtained hydroxygallium phthalocyanine pigment having the water content of 1% or less.

Example 1-7

7.8 G of the hydroxygallium phthalocyanine pigment (water-containing hydroxygallium phthalocyanine pigment) obtained in Synthesis Example 1 was dried as follows, by using a vacuum microwave prototype.

The hydroxygallium phthalocyanine pigment obtained in Synthesis Example 1 was put on a glass-made laboratory dish (Petri dish), nitrogen was introduced into a vacuum container at a rate of 3.0 L/min, and the pressure inside the vacuum container was adjusted to 3 kPa±0.5 kPa by using a vacuum pump.

Then, the hydroxygallium phthalocyanine pigment was continuously irradiated with 100-W microwaves having frequency (resonance frequency) of 2455 MHz±15 MHz for 2.5 hours.

Through those steps, 1.7 g of the hydroxygallium phthalocyanine pigment having the water content of 3% was obtained in total 3 hours.

Figure 4:
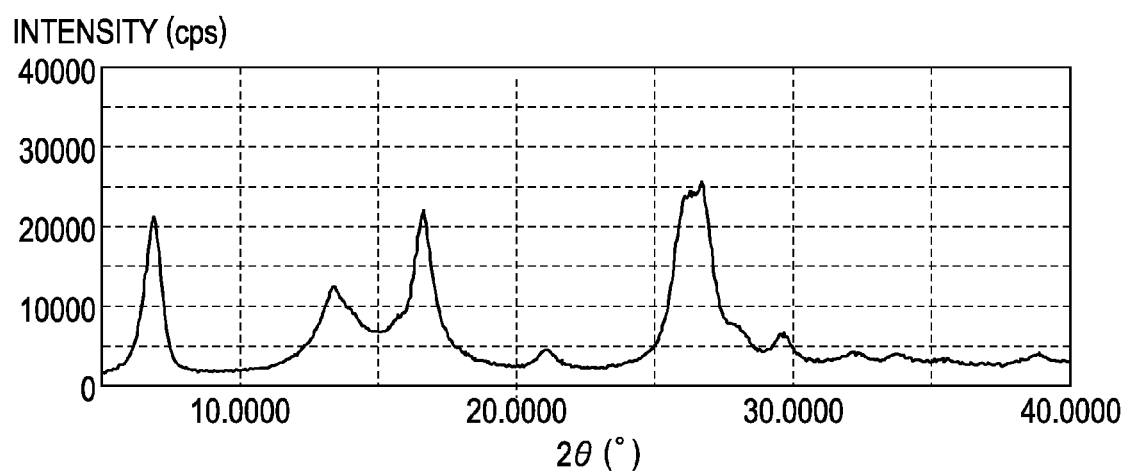
FIG. 4 is a powder X-ray diffraction chart of a hydroxygallium phthalocyanine pigment obtained in Example 1-7.

FIG. 4 is a powder X-ray diffraction chart of the obtained hydroxygallium phthalocyanine pigment having the water content of 3%.

Comparative Example 1-1

6.6 Kg of the hydroxygallium phthalocyanine pigment (water-containing hydroxygallium phthalocyanine pigment) obtained in Synthesis Example 1 was dried as follows, by using a vacuum freeze drier (trade name: BFD-500BE, made by Nihon Freezer Co., Ltd.).

The hydroxygallium phthalocyanine pigment obtained in Synthesis Example 1 was uniformly packed (in the form of a water-containing cake having a thickness of 2.5 cm) over three dedicated SUS-made palettes.

Then, a drying rack was cooled and kept in a cooled state for 5 hours to wait until the water-containing cake was frozen. Further, after depressurizing the drier until the degree of vacuum (i.e., the pressure inside the drier) reached 20 kPa or below, the temperature of the drying rack was set to 40° C., whereby freeze drying of the hydroxygallium phthalocyanine pigment was performed.

Through those steps, 1.5 kg of the hydroxygallium phthalocyanine pigment having the water content of 1% or less was obtained in total 65 hours. Note that the degree of vacuum (i.e., the pressure inside the drier) at the end of the freeze drying was 8 kPa.

Figure 5A:
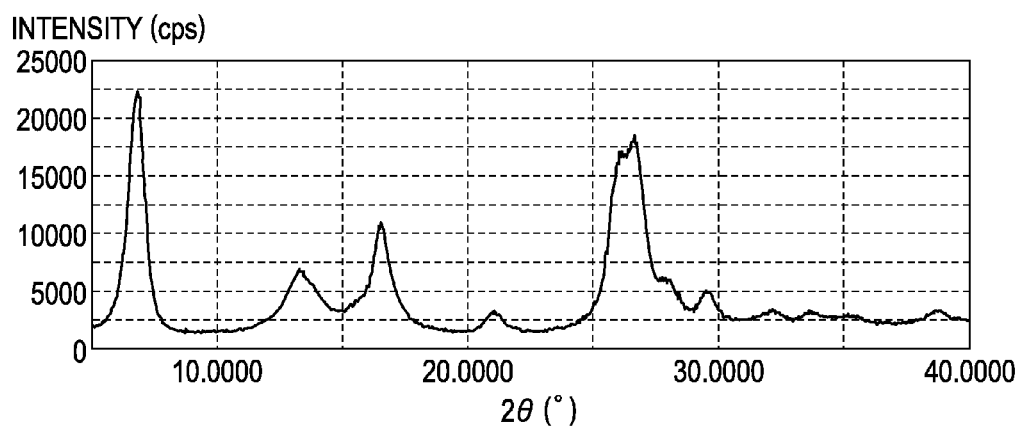
FIG. 5A is a powder X-ray diffraction chart of a hydroxygallium phthalocyanine pigment obtained in Comparative Example 1-1.

FIG. 5A is a powder X-ray diffraction chart of the obtained hydroxygallium phthalocyanine pigment having the water content of 1% or less.

Comparative Example 1-2

12.7 G of the hydroxygallium phthalocyanine pigment (water-containing hydroxygallium phthalocyanine pigment) obtained in Synthesis Example 1 was dried as follows, by using a vacuum drier (trade name: T-30D, made by Kaneda Scientific Co., Ltd.).

The hydroxygallium phthalocyanine pigment obtained in Synthesis Example 1 was lightly wrapped with an aluminum-made cake cup, the temperature of a drying rack was set to 40° C., and the degree of vacuum (i.e., the pressure inside the drier) was set to 3 kPa or below, whereby vacuum drying of the hydroxygallium phthalocyanine pigment was performed. A solid content in the hydroxygallium phthalocyanine pigment was 33% after 3.5 hours, 82% after 11 hours, and 96% after 19 hours.

Through those steps, 3.0 g of the hydroxygallium phthalocyanine pigment having the water content of 3% was obtained in total 31 hours.

Figure 5B:
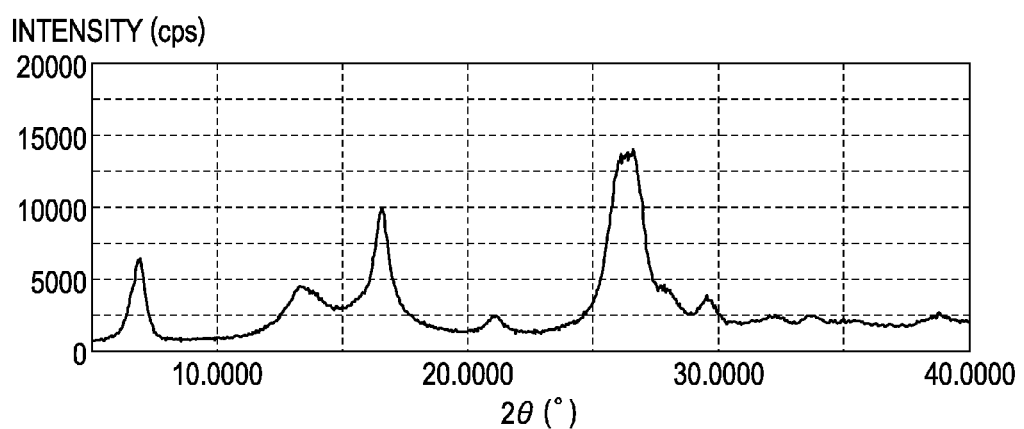
FIG. 5B is a powder X-ray diffraction chart of a hydroxygallium phthalocyanine pigment obtained in Comparative Example 1-2.

FIG. 5B is a powder X-ray diffraction chart of the obtained hydroxygallium phthalocyanine pigment having the water content of 3%.

Example 1-8

200 G of the azo pigment (water-containing azo pigment) obtained in Synthesis Example 2 and expressed by the above-mentioned structural formula (2) was dried as follows, by using a hyper-dry drier (trade name: HD-LAB, having frequency (resonance frequency) of 2455 MHz±15 MHz and made by Biocon (Japan) Ltd.).

The azo pigment obtained in Synthesis Example 2 and expressed by the above-mentioned structural formula (2) was put on a dedicated circular plastic tray in a solid state as it was immediately after being taken out from the filter press. In the drier, far infrared rays were adjusted such that the dummy temperature in a central portion of the drier was set to 50° C. The temperature of an inner wall of the drier was also set to 50° C. During irradiation of microwaves, a vacuum pump and a leak valve were regulated such that a degree of vacuum was set to a value in the range of 4.0 to 10.0 kPa.

As a first step, the azo pigment was irradiated with 0.2-kW microwaves for 40 minutes. Then, the microwaves were temporarily turned off and the leak valve was temporarily closed to produce a high-vacuum state of 1 kPa or below. A solid content in the azo pigment at that time was 52%.

As a second step, after regulating the leak valve to adjust the degree of vacuum (i.e., the pressure inside the drier) to be within the above-mentioned setting value range (4.0 to 10.0 kPa), the azo pigment was irradiated with 0.1-kW microwaves for 3 minutes. Then, the microwaves were temporarily turned off and the leak valve was temporarily closed to produce a high-vacuum state of 1 kPa or below. The second step was repeated fifteen times more (i.e., sixteen times in total).

Through those steps, 40 g of the azo pigment having the water content of 1% or less and expressed by the above-mentioned structural formula (2) was obtained in total 3.5 hours.

Figure 6A:
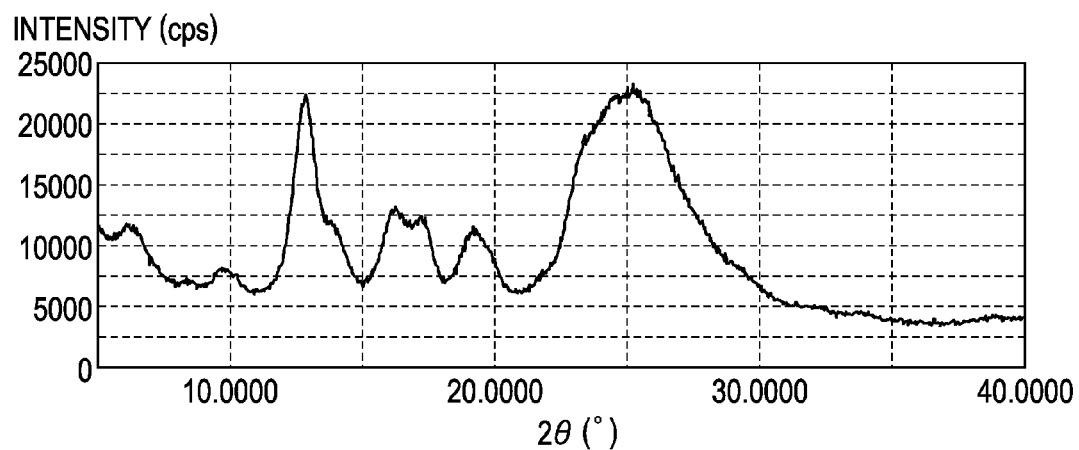
FIG. 6A is a powder X-ray diffraction chart of an azo pigment obtained in Example 1-8.

FIG. 6A is a powder X-ray diffraction chart of the obtained azo pigment having the water content of 1% or less.

Example 1-9

3.6 G of the azo pigment (water-containing azo pigment) obtained in Synthesis Example 2 and expressed by the above-mentioned structural formula (2) was dried as follows, by using a vacuum microwave prototype.

The azo pigment obtained in Synthesis Example 2 and expressed by the above-mentioned structural formula (2) was put on a glass-made laboratory dish, nitrogen was introduced into a vacuum container at a rate of 3.0 L/min, and the pressure inside the vacuum container was adjusted to 3 kPa±0.5 kPa by using a vacuum pump.

Then, the azo pigment was continuously irradiated with 100-W microwaves having frequency (resonance frequency) of 2455 MHz±15 MHz for 3 hours.

Through those steps, 0.8 g of the azo pigment having the water content of 14% and expressed by the above-mentioned structural formula (2) was obtained in total 3.5 hours.

Figure 6B:
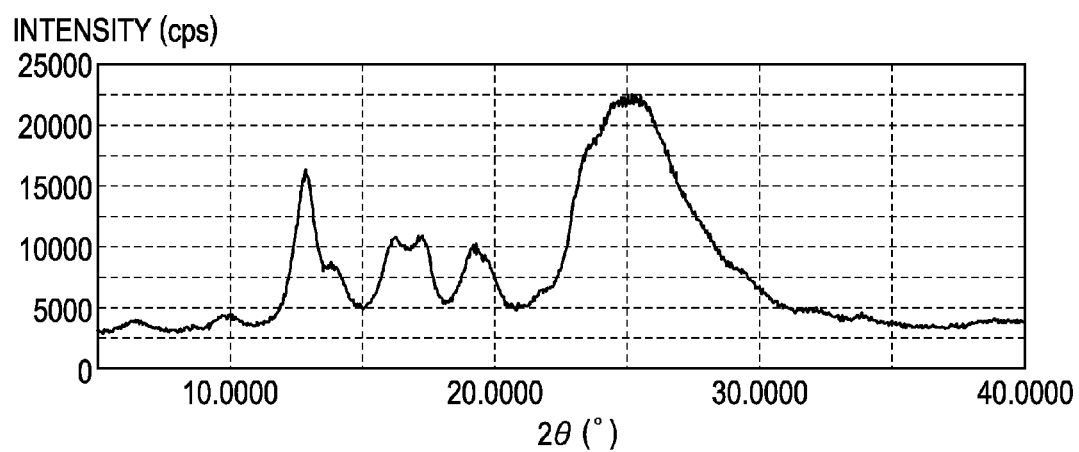
FIG. 6B is a powder X-ray diffraction chart of an azo pigment obtained in Example 1-9.

FIG. 6B is a powder X-ray diffraction chart of the obtained azo pigment having the water content of 14%.

Comparative Example 1-3

7.0 Kg of the azo pigment (water-containing azo pigment) obtained in Synthesis Example 2 and expressed by the above-mentioned structural formula (2) was dried as follows, by using a vacuum freeze drier (trade name: BFD-500BE, made by Nihon Freezer Co., Ltd.).

The azo pigment obtained in Synthesis Example 2 and expressed by the above-mentioned structural formula (2) was uniformly packed (in the form of a water-containing cake having a thickness of 2.5 cm) over three dedicated SUS-made palettes.

Then, a drying rack was cooled and kept in a cooled state for 6 hours to wait until the water-containing cake was frozen. Further, after depressurizing the drier until the degree of vacuum (i.e., the pressure inside the drier) reached 20 kPa or below, the temperature of the drying rack was set to 40° C., whereby freeze drying of the azo pigment was performed.

Through those steps, 1.4 kg of the azo pigment having the water content of 1% or less and expressed by the above-mentioned structural formula (2) was obtained in total 90 hours.

Figure 7:
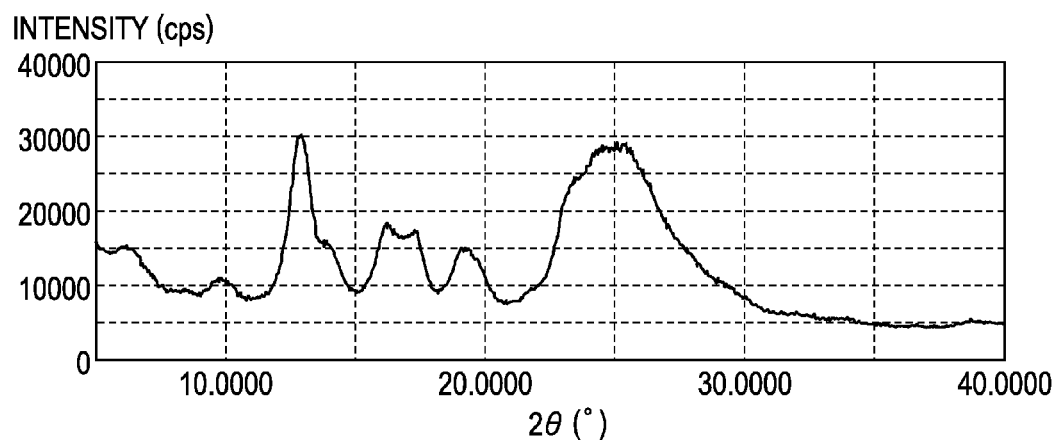
FIG. 7 is a powder X-ray diffraction chart of an azo pigment obtained in Comparative Example 1-3.

FIG. 7 is a powder X-ray diffraction chart of the azo pigment having the water content of 1% or less.

As seen from the above description, in Examples 1-1 to 1-9 each employing the drying method according to the present invention, the drying process is completed in a shorter time regardless of the amount of the pigment to be dried and higher productivity is obtained in comparison with Comparative Examples 1-1 to 1-3 in which the drying method according to the present invention is not employed.

Example 2-1

5 Parts of the hydroxygallium phthalocyanine pigment obtained in Example 1-1 and 95 parts of N,N-dimethylformamide were put in a ball mill together with 200 parts of glass beads having a diameter of 0.8 mm and were subjected to the milling process for 24 hours at room temperature (22° C.). After the milling process, a solid content was taken out from the dispersion liquid and was sufficiently washed by using tetrahydrofuran. By vacuum-drying the washed solid content, 4.5 parts of the hydroxygallium phthalocyanine pigment (hydroxygallium phthalocyanine crystal) was obtained which had the crystal form exhibiting strong peaks at Bragg angles 2θ of 7.3° and 28.2° in CuKα-characteristic X-ray diffraction.

Figure 8:
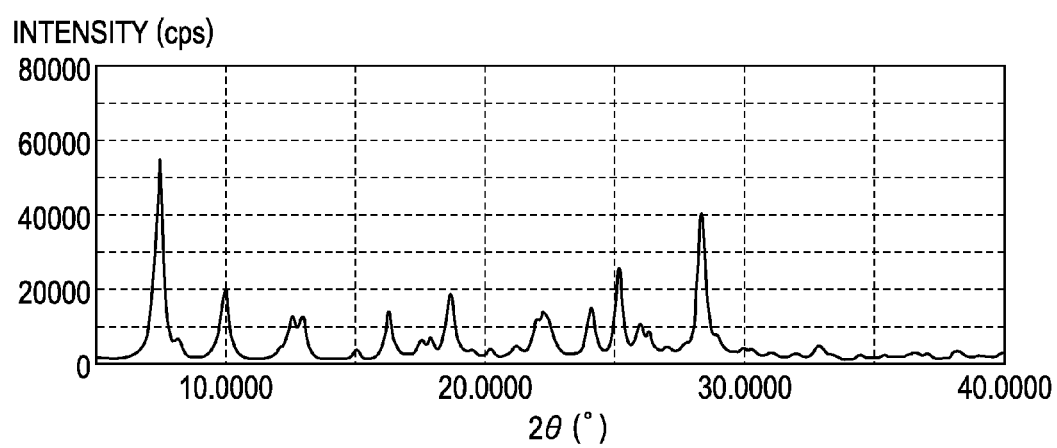
FIG. 8 is a powder X-ray diffraction chart of a hydroxygallium phthalocyanine pigment obtained in Example 2-1.

FIG. 8 is a powder X-ray diffraction chart of the obtained hydroxygallium phthalocyanine pigment.

Examples 2-2, 2-3, 2-4, 2-5, 2-6 and 2-7

The hydroxygallium phthalocyanine pigments obtained Examples 1-2, 1-3, 1-4, 1-5, 1-6 and 1-7, respectively, were processed in a similar manner to that in Example 2-1.

Powder X-ray diffraction charts of the obtained hydroxygallium phthalocyanine pigments were each similar to that illustrated in FIG. 8.

Comparative Examples 2-1 and 2-2

The hydroxygallium phthalocyanine pigments obtained in Comparative Examples 1-1 and 1-2, respectively, were processed in a similar manner to that in Example 2-1.

Powder X-ray diffraction charts of the obtained hydroxygallium phthalocyanine pigments were each similar to that illustrated in FIG. 8.

Example 3-1

An aluminum cylinder having a diameter of 30 mm was used as the support.

A coating liquid for the conductive layer was prepared by putting 50 parts of titanium oxide particles covered with tin oxide containing 10% of antimony oxide, 25 parts of a resol-type phenol resin, 20 parts of methylcellosolve, 5 parts of methanol, and 0.002 part of silicone oil (polydimethylsiloxane-polyoxyalkylene copolymer with mean molecular weight of 3000) in a sand mill together with glass beads having a diameter of 0.8 mm, and conducting a dispersion process of the mixture liquid for 2 hours. The prepared coating liquid for the conductive layer was coated on the support by immersion and was dried for 30 minutes at 140° C. The conductive layer having a thickness of 18 μm was thereby formed.

Then, a coating liquid for the underlying layer was prepared by dissolving 5 parts of a 6-66-610-12 quaternary polyamide copolymer in a mixed solvent of 70 parts of methanol and 25 parts of n-butanol. The prepared coating liquid for the underlying layer was coated on the conductive layer by immersion and was dried. The underlying layer having a thickness of 0.7 μm was thereby formed.

Then, 10 parts of the hydroxygallium phthalocyanine pigment (charge generating material) obtained in Example 2-1, 5 parts of a polyvinyl butyral resin (trade name: S-LEC BX-1, made by Sekisui Chemical Co., Ltd.), and 250 parts of cyclohexane were put in a sand mill together with glass beads having a diameter of 0.8 mm, and the mixture liquid was subjected to a dispersion process for 6 hours. Further, 200 parts of cyclohexane and 350 parts of ethylacetate were added to the mixture liquid for dilution. As a result, a dispersion liquid for the charge generating layer (i.e., a coating liquid for the charge generating layer) was prepared. The prepared dispersion liquid was coated on the underlying layer by immersion and was dried for 10 minutes at 100° C. The charge generating layer having a thickness of 0.15 μm was thereby formed.

Then, a coating liquid for the charge transporting layer was prepared by dissolving 8 parts of a compound (charge transporting material) expressed by the following structural formula (3);

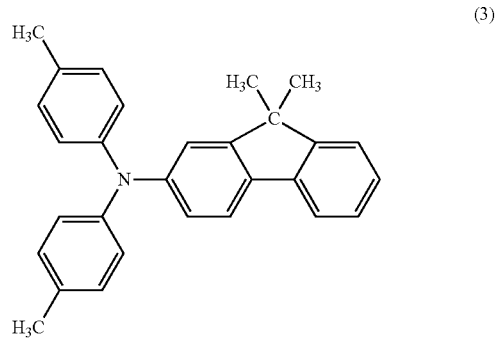 [SMILES: Cc1ccc(N(c2ccc(C)cc2)c2ccc3c(c2)C(C)(C)c2ccccc2-3)cc1]

(3)

1 part of a compound (charge transporting material) expressed by the following structural formula (4);

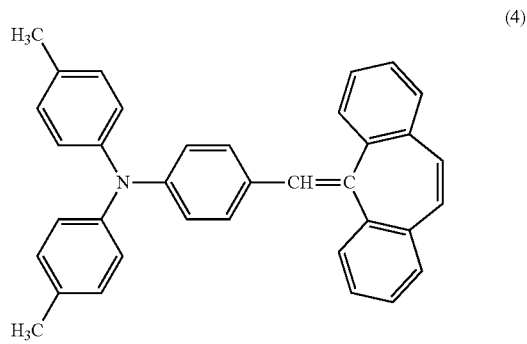 [SMILES: Cc1ccc(N(c2ccc(C)cc2)c2ccc(C=C3c4ccccc4C=Cc4ccccc43)cc2)cc1]

(4)

and 10 parts of polyarylate in a mixed solvent of 70 parts of monochlorobenzene and 30 parts of methylal. The prepared coating liquid for the charge transporting layer was coated on the charge generating layer by immersion and was dried for 1 hour at 110° C. The charge transporting layer having a thickness of 18 μm was thereby formed.

As described above, an electrophotographic photosensitive member including the support, the conductive layer, the underlying layer, the charge generating layer, and the charge transporting layer was manufactured.

Examples 3-2, 3-3, 3-4, 3-5, 3-6 and 3-7

Electrophotographic photosensitive members were manufactured in a similar manner to that in Example 3-1 except for using, as the charge generating material, each of the hydroxygallium phthalocyanine pigments obtained in Examples 2-2, 2-3, 2-4, 2-5, 2-6 and 2-7.

Comparative Examples 3-1 and 3-2

Electrophotographic photosensitive members were manufactured in a similar manner to that in Example 3-1 except for using, as the charge generating material, each of the hydroxygallium phthalocyanine pigments obtained in Comparative Examples 2-1 and 2-2.

Evaluation 1 of Electrophotographic Photosensitive Members

The electrophotographic photosensitive members manufactured in Examples 3-1 to 3-7 and Comparative Examples 3-1 and 3-2 were evaluated as follows.

An evaluation apparatus used was a modified model (employing negative charging and contact charging with a charging roller, and applying only a DC voltage to the charging roller) of a laser printer (trade name: Laser Jet 4000, process speed of 94.2 mm/s) made by Hewlett-Packard Company. Charging conditions of the evaluation apparatus were set such that a surface potential (VD) of the electrophotographic photosensitive member was held at −630 V. The surface potential of the electrophotographic photosensitive member was measured by removing a development cartridge from the evaluation apparatus and inserting a potential measurement device instead. The potential measurement device had a potential measurement probe disposed at a position where development was performed by the development cartridge. With respect to the electrophotographic photosensitive member, the potential measurement probe was positioned at a center of the electrophotographic photosensitive member in its axial direction with a gap of 3 mm left from the surface of the electrophotographic photosensitive member. Further, an image exposure apparatus was modified such that the intensity of a laser beam was 0.32 µJ/cm$^2$. The measurement and the evaluation were all conducted in an environment with temperature of 25° C. and humidity of 50% (RH). Moreover, the electrophotographic photosensitive member had been left in the environment with temperature of 25° C. and humidity of 50% (RH) for 24 hours before start of the measurement and the evaluation. After charging the electrophotographic photosensitive member in such a state, the electrophotographic photosensitive member was irradiated with the laser beam, and a light-area potential (VL) was measured after the electrophotographic photosensitive member had rotated twice. The measured results are listed in Table 1. It can be said that the smaller an absolute value of the light-are potential (VL), the higher is sensitivity.

In addition, a positive ghost was evaluated as follows.

After outputting two solid black images, a half-tone test chart was output on which solid black areas each having a 25-mm square shape were arrayed in a portion of a printed image, corresponding to the first rotation of the electrophotographic photosensitive member, from a start position of the printed image and a 1-dot knight-move pattern was printed in another portion of the printed image corresponding to the second and subsequent rotations of the electrophotographic photosensitive member. Then, a level of image history of the 25-mm square solid black areas appearing on the half-tone test chart was visually evaluated. A level of the positive ghost was classified in accordance with the following criteria:

Level A: No ghosts were recognized.

Level B: Contours representing the image history were recognized just as slight as not problematic in practice.

Level C: Contours representing the image history were recognized.

The evaluation results are listed in Table 1 below.

TABLE 1

|  | VL [V] | Ghost |
| --- | --- | --- |
| Example 3-1 | −140 | A |
| Example 3-2 | −140 | A |
| Example 3-3 | −140 | B |
| Example 3-4 | −140 | A |
| Example 3-5 | −140 | B |
| Example 3-6 | −140 | A |
| Example 3-7 | −140 | A |
| Comparative Example 3-1 | −140 | C |
| Comparative Example 3-2 | −180 | C |

As seen from the evaluation results listed in Table 1, the electrophotographic photosensitive members of Examples 3-1 to 3-7 have higher sensitivity and are less apt to generate the positive ghost than the electrophotographic photosensitive members of Comparative Examples 3-1 and 3-2. The electrophotographic photosensitive members of Examples 3-1 to 3-7 employ the hydroxygallium phthalocyanine pigments that have been dried by using the drying method according to the present invention. On the other hand, the electrophotographic photosensitive members of Comparative Examples 3-1 and 3-2 employ the hydroxygallium phthalocyanine pigments that have been dried in a manner not using the drying method according to the present invention.

Example 4-1

An aluminum cylinder having a diameter of 30 mm was used as the support.

A coating liquid for the conductive layer was prepared by putting 50 parts of titanium oxide particles covered with tin oxide containing 10% of antimony oxide, 25 parts of a resol-type phenol resin, 20 parts of methylcellosolve, 5 parts of methanol, and 0.002 part of silicone oil (polydimethylsiloxane-polyoxyalkylene copolymer with mean molecular weight of 3000) in a sand mill together with glass beads having a diameter of 0.8 mm, and conducting a dispersion process of the mixture liquid for 2 hours.

The prepared coating liquid for the conductive layer was coated on the support by immersion and was dried for 30 minutes at 140° C. The conductive layer having a thickness of 18 µm was thereby formed.

Then, a coating liquid for the underlying layer was prepared by dissolving 5 parts of a 6-66-610-12 quaternary polyamide copolymer in a mixed solvent of 70 parts of methanol and 25 parts of n-butanol. The prepared coating liquid for the underlying layer was coated on the conductive layer by immersion and was dried. The underlying layer having a thickness of 0.7 µm was thereby formed.

Then, 10 parts of the azo pigment obtained in Example 1-8 and expressed by the above-mentioned structural formula (2), and 200 parts of tetrahydrofuran were put in a sand mill together with 470 parts of glass beads having a diameter of 0.8 mm, and the mixture liquid was subjected to a dispersion process for 20 hours at 25° C. Then, a solution obtained by dissolving 2 parts of a butyral resin (trade name: BL-S, made by Sekisui Chemical Co., Ltd.) in 18 parts of tetrahydrofuran was added thereto, and the mixture liquid was further subjected to a dispersion process for 2 hours. Thereafter, 185 parts of tetrahydrofuran and 185 parts of cyclohexane were added to the mixture liquid for dilution. As a result, a dispersion liquid for the charge generating layer (i.e., a coating liquid for the charge generating layer) was prepared. The prepared dispersion liquid was coated on the underlying layer by immersion and was dried for 10 minutes at 100° C. The charge generating layer having a thickness of 0.21 μm was thereby formed.

Then, a coating liquid for the charge transporting layer was prepared by dissolving 10 parts of a compound (charge transporting material) expressed by the above-mentioned structural formula (3) and 10 parts of polycarbonate (trade name: Iupilon Z-200, made by Mitsubishi Engineering-Plastics Corporation) in a mixed solvent of 70 parts of monochlorobenzene and 20 parts of methylal. The prepared coating liquid for the charge transporting layer was coated on the charge generating layer by immersion and was dried for 1 hour at 110° C. The charge transporting layer having a thickness of 20 μm was thereby formed.

As described above, an electrophotographic photosensitive member including the support, the conductive layer, the underlying layer, the charge generating layer, and the charge transporting layer was manufactured.

Example 4-2

An electrophotographic photosensitive member was manufactured in a similar manner to that in Example 4-1 except for using, as the charge generating material, the azo pigment obtained in Example 1-9.

Comparative Example 4-1

An electrophotographic photosensitive member was manufactured in a similar manner to that in Example 4-1 except for using, as the charge generating material, the azo pigment obtained in Comparative Example 1-3.

Evaluation 2 of Electrophotographic Photosensitive Members

The electrophotographic photosensitive members manufactured in Examples 4-1 and 4-2 and Comparative Example 4-1 were evaluated as follows.

Electrophotographic characteristics of the manufactured electrophotographic photosensitive members were evaluated by measuring their photodischarge characteristics with the aid of a recessed conductive glass. A light source used was a halogen lamp of which emission light was converted to a monochromatic light by using an interference filter with a wavelength of 403 nm. Charging conditions were adjusted such that an initial surface potential of a sample, i.e., the electrophotographic photosensitive member, was held at −700 V. An exposure amount E½ taken until the surface potential of the electrophotographic photosensitive member had attenuated down to a half was measured. The measured results are listed in Table 2 below. It can be said that the smaller the value of E½, the higher is sensitivity.

TABLE 2

|  | E½ [×10$^{-2}$ J/m$^2$] |
| --- | --- |
| Example 4-1 | 0.29 |
| Example 4-2 | 0.29 |
| Comparative Example 4-1 | 0.31 |

As seen from the measured results listed in Table 2, the electrophotographic photosensitive members of Examples 4-1 and 4-2, which employ the azo pigments dried by using the drying method according to the present invention, have higher sensitivity than the electrophotographic photosensitive member of Comparative Example 4-1, which employs the azo pigment dried without using the drying method according to the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-223775 filed Sep. 29, 2009 and No. 2010-161940 filed Jul. 16, 2010, which are hereby incorporated by reference herein in their entirety.

What is claimed is:

1. A method of drying an organic pigment, the method comprising the steps of:
    (i) filtrating dispersion liquid of the organic pigment to obtain the organic pigment containing water or organic solvent; and then
    (ii) irradiating the organic pigment containing water or organic solvent with microwaves under depressurization to dry the organic pigment.

2. The method of drying the organic pigment according to claim 1, wherein a degree of vacuum in the under-depressurization microwave drying step is in a range of 2 kPa to 10 kPa.

3. The method of drying the organic pigment according to claim 1, wherein nitrogen is introduced in the under-depressurization microwave drying step.

4. The method of drying the organic pigment according to claim 1, further including a step of temporarily turning off the microwaves and producing a state of 2 kPa or below during the under-depressurization microwave drying step.

5. The method of drying the organic pigment according to claim 1, wherein the organic pigment to be dried in the under-depressurization microwave drying step is a water-containing organic pigment.

6. The method of drying the organic pigment according to claim 1, wherein the organic pigment is a phthalocyanine pigment or an azo pigment.

7. The method of drying the organic pigment according to claim 1, wherein the organic pigment is a hydroxygallium phthalocyanine pigment.

8. A method of processing a phthalocyanine pigment, the method comprising:
    an acid pasting step of performing an acid pasting treatment of the phthalocyanine pigment; and
    a drying step of drying the phthalocyanine pigment by the drying method according to claim 1 after the acid pasting step.

9. The method of processing the phthalocyanine pigment according to claim 8, wherein the phthalocyanine pigment is a hydroxygallium phthalocyanine pigment.

10. A method of manufacturing an electrophotographic photosensitive member including a support and a photosensitive layer on the support, the method comprising:
    a drying step of drying an organic pigment by the drying method according to claim 1; and
    a photosensitive layer forming step of, after the drying step, forming the photosensitive layer by using the dried organic pigment.

11. The method of manufacturing the electrophotographic photosensitive member according to claim 10, wherein the organic pigment is a phthalocyanine pigment or an azo pigment.

12. The method of manufacturing the electrophotographic photosensitive member according to claim 10, wherein the organic pigment is a hydroxygallium phthalocyanine pigment.

\* \* \* \* \*